May 14, 1963  H. J. TIERNEY ETAL  3,089,801
ULTRA-THIN GLASS SHEET
Filed May 27, 1957

INVENTORS
HUBERT J. TIERNEY
HANS THURNAUER
BY Carpenter, Abbott, Coulter & Kinney
ATTORNEYS

United States Patent Office 3,089,801
Patented May 14, 1963

---

3,089,801
ULTRA-THIN GLASS SHEET
Hubert J. Tierney and Hans Thurnauer, St. Paul, Minn., assignors to Minnesota Mining and Manufacturing Company, St. Paul, Minn., a corporation of Delaware
Filed May 27, 1957, Ser. No. 661,945
2 Claims. (Cl. 154—47)

This invention relates to novel means for protecting and supporting thin glass sheet.

As part of the extensive development of reinforced plastics, a good deal of effort has been expended throughout the industry to provide finishes or surface coverings of improved beauty and durability. For example, reinforced plastic radomes for aircraft are subject to erosion by rain, hail and sand and normally require frequent replacement. The need for more impervious coverings is particularly severe in high speed aircraft and missiles. Moreover, heating of their leading edges at supersonic speeds can be severe and the need for better insulation without added weight is acute.

While one might anticipate that glass sheet could be laminated to reinforced plastic to provide a glossy, scratch-resistant surface covering, one would not expect the resultant composite to be very rugged. By analogy to safety glass, plate glass could receive support from rigid reinforced plastic cured in contact therewith. However, differences in coefficients of thermal expansion would doubtless be perplexing. Such difficulties would be expected to be multiplied to the point of frustration if one were to use very thin glass, e.g., of less than about 0.010 inch in thickness.

Accordingly, it comes as a great surprise that glass of thickness in the order of 0.001 to 0.010 inch can provide protective coverings for reinforced plastics of such toughness and durability that repeated blows with a steel hammer have little effect and, unless very heavy, do not even scratch the surface. Remarkably, the toughest laminate which has been produced utilized the thinnest glass on the market, about 0.0013 inch in thickness, a material so fragile that it is not available commercially at the time of filing of this application in widths of more than about 1.5 inches, and even though it is packed for transportation with extraordinary care, some breakage has heretofore occurred in almost every shipment with which the inventors have been connected.

This invention deals with novel means for protecting and supporting ultra-thin glass to render its shipment less hazardous and to provide convenient means for handling the glass in its application to reinforced plastics, especially in laying the glass around curved shapes. Briefly, this involves temporarily adhering the glass to a carrier web by means of a permanently lightly tacky adhesive layer on such web. The backing of the carrier web is selected to have sufficient flexibility to allow the temporary composite to be wound in roll form for storage or transportation and to be subsequently unwound and conformed to any surface to which the glass is to be ultimately applied. On the other hand, it must have sufficient strength and stiffness to resist moderate forces, as might be applied in normal use, tending to stress the composite to a degree such that the glass may break.

An ordinary highly cohesive, low-tack adhesive of the rubber-resin type is suitable as long as the glass remains adhered thereto over the area of contact when the temporary composite is flexed to a point short of fracturing the glass. A simple test for determining the utility of a particular adhesive involves applying the adhesive to cellophane and adhering the tape thus created by its own adhesive to a clean polished steel plate. A 4.5 pound, hard rubber roller is then passed once over the tape at the rate of 7.5 feet per minute. One end of the strip is attached to a suitable scale, and the steel plate is moved away from the scale at the rate of 7.5 feet per minute so that the portion of the tape removed comes back adjacent but not quite touching the portion still adherently attached. Rubbery, stably tacky adhesives which yield values of about 1 to 12 ounces per inch of width are normally preferred.

Reinforced plastics have been used extensively in applications requiring a combination of high strength and heat insulation, but their use as such has been subject to the limited heat resistance of the plastic material. It has now been found that the insulating value of reinforced plastics may be greatly improved, either by introducing a micro-thin layer of heat-reflective metal between the reinforced plastic and a surface layer of thin glass or by applying such metallic layer to the glass surface of a reinforced plastic article veneered with ultra-thin glass. While the latter composite provides better heat reflectivity, the excellent resistance to erosion, oxidation or other weathering effect of the ultra-thin glass sheet makes preferable for many applications the location of the metallic layer beneath the glass sheet.

To fabricate a laminate of reinforced plastic, glass sheet and metal, in which the metal is applied to the glass by vapor deposition techniques in the present state of the art, the glass must be scrupulously clean to obtain adequate adhesion. If the glass is not first properly cleaned, the bond between the glass and metal may appear to have good integrity. However, the metal vapor coat can be rubbed off with the thumb, and when a panel having a layer of metal between the glass and the reinforced plastic is cut with a saw or tapped by a hammer, the glass shatters due to poor adhesion. The glass may be suitably cleaned by subjecting it to electron bombardment in a vacuum or by heating the glass, e.g., by infrared lamps, to at least 300° F. The former procedure is preferred for many purposes since it involves heating of the glass to no higher than 250° F.

When the metal layer is located at the exterior of a glass-veneered reinforced plastic article, some protection to abrasion and chemical attack may be afforded the metal by applying thereover a vapor coating of silicon monoxide, magnesium sulfide, zinc sulfide, titanium dioxide or other material transparent to thermal radiation and preferably one which forms a hard, tough layer. Moreover, such materials applied either singly or in combination at predetermined thicknesses can provide an interference film to serve to improve reflectance at desired frequencies, as is well known in the optical art. However, because of their extreme thinness, transparent vapor coatings do not provide protection comparable to that of a glass veneer of 0.001–0.010 inch in thickness.

The accompanying drawing illustrates the invention by a series of fragmentary diagrammatic side or edge views, in which.

Figure 1:
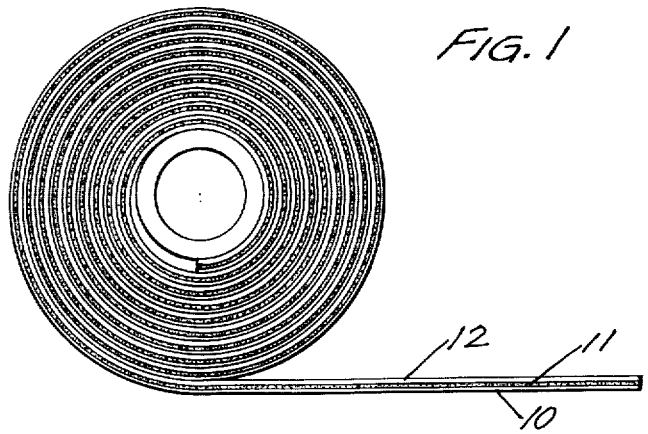
FIGURE 1 shows a roll of a temporary composite of ultra-thin glass sheet and permanently lightly tacky adhesive carrier web.

Referring in detail to the drawing, a thin sheet of glass 10 is temporarily adhered to a rubbery, lightly tacky adhesive layer 11 of a flexible sheet 12, which sheet may consist of kraft or flatstock paper, aluminum or other flexible material. Normally, immediately upon formation and cooling of the glass sheet 10, it is adhered to the sheet 12 and wound therewith into roll form, glass outwards, as shown in FIGURE 1. Such a roll is readily transportable without greater precaution than is required for ordinary fragile articles and can withstand far greater shocks without injury than could the same glass wound or interlaid with untreated kraft paper as has been previously done.

Figure 2:
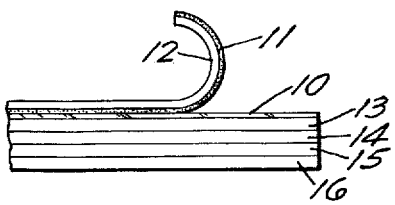
FIGURE 2 shows a piece of the temporary composite of FIGURE 1 as the top sheet of a stack of uncured reinforced plastic sheets, and the lightly tacky carrier sheet being stripped away.

FIGURE 2 illustrates the application of the thin sheet of glass 10 as the top sheet of superposed warps 13, 14 15 and 16 of continuous lineally-aligned glass filaments bonded together by a fusible, thermosetting resinous composition. Normally, the resin possesses sufficient tackiness to hold the glass sheet 10 in place while the adhesive-coated carrier sheet 12 is stripped away as shown in FIGURE 2. If not, the application of a moderate degree of heat imparts suitable tackiness to the resin of the warp 13. It should be noted that it may sometimes be desirable to wind the composite shown in FIGURE 2, either with or without low-tack carrier sheet 12, in roll form for storage or transportation. Such use, of course presupposes that the resinous impregnant will remain sufficiently flexible to allow unwinding after contemplated periods of storage and a corresponding retention of sufficient adhesion between the glass and resinous sheet. In some cases, refrigeration is desirable to retard curing of the resin and thus insure the retention of flexibility and adhesion.

Figure 3:
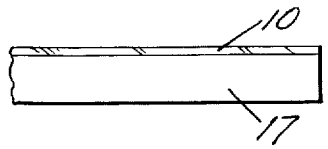
FIGURE 3 shows the stack of FIGURE 2 after it has been cured under heat and pressure to a strong, integral laminate.

After removal of the carrier sheet 12, the composite shown in FIGURE 2 may be placed in a heated platen press and subjected to the simultaneous application of heat and pressure sufficient to set the resinous composition and to provide the dense structure of FIGURE 3. As illustrated, the reinforced resinous sheets 13, 14, 15 and 16 amalgamate in the curing operation into an integral panel 17 having a veneer of glass 10.

It should be noted that the carrier sheet 12 may in some instances be allowed to remain in place during curing, and such procedure could allow the use of an adhesive having a high degree of tackiness. However, the adhesive layer 11 may not strip cleanly from the glass 10 after undergoing the conditions of curing the resin, unless the adhesive is of a heat-resistant type.

Figure 4:
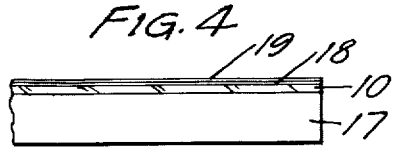
FIGURE 4 shows a cured laminate similar to that of FIGURE 3 and including as additional surface laminate, a micro-thin layer of heat-reflective metal and an interference film of hard, tough material.

A cured reinforced plastic structural sheet of excellent heat-reflectivity is provided by supplying the glass-veneered panel 17 of FIGURE 3 with an additional layer 18 of heat-reflective metal such as aluminum as shown in FIGURE 4. The metal layer 18 is conveniently applied by vapor deposition to the thoroughly cleaned exposed surface of the veneer layer 10 of the cured panel 17. For most purposes, it is preferred that one or more dielectrics be applied over the metal layer 18 by means of vapor deposition to provide a tough, protective layer 19, which layer may also serve as an interference film.

Figure 5:
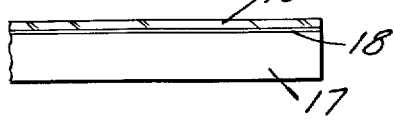
FIGURE 5 shows another heat-reflective panel incorporating as an intermediate layer of a laminate of ultra-thin glass sheet and cured reinforced plastic a micro-thin layer of metal having good reflectivity to thermal radiation.

In FIGURE 5, a micro-thin layer 18 of heat-reflective metal is located between the reinforced plastic panel 17 and the glass veneer 10 to provide a heat-reflective structure having a tough, impervious, erosion-resistant protective surface. Conveniently, the structural sheet of FIGURE 5 is fabricated by coating ultra-thin and thoroughly cleaned glass sheet with the heat-reflective metal by means of vapor deposition, stacking sheets of uncured reinforced plastic with the glass sheet at the top, metal side inwardly, and subjecting the whole to heat and pressure to convert the stack to a strong, integral panel.

Figure 6:
FIGURE 6 shows a heat-cured, compressed laminate consisting of alternate layers of ultra-thin glass and reinforced plastic sheeting.

FIGURE 6 illustrates a cured, compressed reinforced plastic panel, in which ultra-thin glass laminae 20 are interspersed between layers 21 of reinforced plastic in addition to serving as protective veneers. Each of layers 21 may be formed from a single sheet or a number of sheets of reinforced plastic, and the reinforcement in any layer may be any one or combination of lineally-aligned rovings, woven fabric, randomly oriented fibers or the like. In the event the external glass sheet is punctured or eroded away, the glass sheets in the substratum in turn provide imperviousness and resistance to further erosion. Moreover, the intermediate glass sheets provide strength retention at temperatures at which the resin may soften.

It will also be appreciated that the structural panel illustrated in FIGURE 6 may be provided with micro-thin layers of metal for heat-reflective purposes.

*Example 1*

The thinnest sheet glass presently commercially available is supplied by the Corning Glass Company under the designation "ribbon glass" in thicknesses of 0.0013 to 0.0018 inch in rolls of about one inch width. The glass is marketed on 3-inch spools interwrapped with plain kraft paper. The kraft paper protects the brittle glass to some extent in the roll, but when unwound the glass shatters easily. The glass has a specific gravity of about 3.6.

A one-yard length of "ribbon glass" 1.5 inches in width was carefully unwound from the roll, and the kraft carrier was discarded. The glass was immediately laid against a low-tack adhesive tape of two-inch width. The adhesive tape consisted of a backing of 0.004-inch super-calendered flatstock paper unified with butadiene-acrylonitrile copolymer and coated with a 0.002-inch layer of permanently lightly tacky adhesive, the composition of which consisted essentially of 100 parts natural rubber and 7 parts polyterpene resin. This adhesive, when coated on cellophane, resists stripback at 180 degrees from steel with about 2–10 ounces per inch of width. The precise test is outlined in some detail hereinabove.

As compared to the glass carried by plain kraft paper, the temporary laminate of glass and low-tack adhesive tape had remarkably improved handling qualities and could withstand considerable flexing and bending. It could be repeatedly wound on a one-inch spool, glass outwards, whereas the glass supported only by its original kraft paper carrier normally shatters when subjected to the partial twisting and flexing actions associated with such procedure. When the glass supported by the low-tack tape did break, the fracture was confined to a small area, and there was no hazardous shattering normally accompanying breakage of the glass. When cut with a scissors, the glass showed a ragged edge along the line of cut but was otherwise uninjured. No fissure extended further into the glass than about ⅛ inch. Previously, efforts at cutting the glass invariably resulted in great waste.

The low-tack adhesive carrier was easily removed from the glass at any time. Normally, however, it is desirable to apply the glass to its intended use, e.g., adhering it to uncured, flexible reinforced plastic sheeting, before removing the adhesive carrier. When the adhesive carrier of this example was left in place during curing at 330° F. for about 30 minutes under a pressure of 30 pounds per square inch, the carrier was subsequently stripped away easily without transfer of adhesive to the glass.

In the event that the glass is to be cleaned and supplied with a metal vapor coating, it is preferred that the carrier web and adhesive have sufficient heat resistance to serve as support for the glass during such operations. Since most uncured reinforced plastics are somewhat tacky, these in turn may function as short-term protective carriers after transfer of the glass thereto, allowing it to be handled and shaped with far greater facility than was heretofore possible.

Example II

A sheet of glass having a thickness of about 0.004 to 0.005 inch, available commercially from the Corning Glass Works as "micro-sheet" No. 0 thickness, was washed with detergent, rinsed with isopropyl alcohol and dried with a well-laundered cotton cloth. The glass sheet was placed in a vacuum chamber, and the pressure was reduced to about 20 microns of mercury. A surface of the glass was then subjected to further cleaning by electron bombardment at a potential of 3000 volts with the electrodes focused on the surface from a distance of twenty inches. After one hour, the power was shut off and the pressure was further reduced to less than 0.1 micron of mercury, at which pressure the clean glass surface was exposed to aluminum vapor generated by standard resistance methods of vaporizing aluminum metal. The treatment was continued until a thickness in the order of 0.000002 inch (0.05 micron) was attained. This coating was then subjected to vapors of silicon monoxide to provide a transparent surface layer of about 0.00005 inch (1.3 micron).

After removal from the vacuum chamber, the vapor coated surface of the glass sheet was laid against the top sheet of a stack of thin, flexible, self-sustaining sheets of non-woven, lineally-aligned, continuous glass filaments impregnated with heat-curable resin. The reinforced plastic sheet material had been formed by drawing through a heated bath of epoxy resin and hardener a large number of lineally-aligned continuous glass filaments, viz., 195–200 ends per inch of lightly twisted "Fiberglas" roving, i.e., 140's F.B.F. 7.6 "Garan" finish of Libby Owens Ford Co. The epoxy resin was the condensation product of epichlorhydrin and bisphenol A. Admixed therewith was a hardener consisting essentially of isophthalyl dihydrazide to provide a stable, heat-curable composition which adheres tenaciously to glass when hardened in contact therewith.

The stack of reinforced plastic material, consisting of 14 sheets with the filaments of each layer disposed at 90 degrees to the filaments of adjacent layers, and a surface sheet of the vapor coated glass were then placed together between polished flat heated plates and held for 30 minutes at 330° F. under a pressure of about 30 pounds per square inch to provide a hard cured laminate of 0.136 inch thickness. Although far from optically perfect, the glass-faced surface cast a good reflection and exhibited mirror-smoothness to the touch.

The laminate was sawed into small panels with an ordinary band saw. The sawed edges were clean and relatively smooth to the touch. The outer 0.010 inch of the surface glass showed some irregularity, but no defects extending further than about 0.030 inch toward the center of a panel were observable. The glass-faced surface withstood repeated sharp blows of a steel hammer without injury. The surface was punctured by a steel point under moderate hand pressure, but defects thus created showed no tendency to migrate, even under continued hammering.

One of the panels cut from the laminate was used with its glass surface facing inwardly as the door of an air-circulating oven heated to 1000° F. A thermocouple was held against the outer surface of the panel by a piece of asbestos to insulate it from the surrounding air. The temperature of the thermocouple was noted periodically. For comparison, the test was repeated using an otherwise identical reinforced plastic panel except for the omission of the vapor-coated glass. After three minutes, the panel with the vapor-coated glass surface showed a temperature of 415° F. In the same period of time, the control panel reached 610° F. and burst into flame. The protected panel reached this temperature after more than five minutes elapsed and began to smoke without burning at about six minutes, at which point the test was discontinued.

Laminates of good strength and integrity have been prepared in the practice of this invention using woven glass cloth and mats of randomly oriented glass fibers. While a variety of fibrous materials may serve as the reinforcing medium, fine glass filaments and, particularly, glass rovings are especially preferred for their excellent strength and flexibility.

Resinous compositions ranging in the uncured state from low viscosity unsaturated polyester resins to high melting epoxy resins have been used with success in fabricating the novel laminates. Although epoxy resins are generally preferred because of excellent mechanical, electrical and age-resistant properties and freedom from shrinkage and evolution of volatiles upon curing, phenolic, melamine or certain silicone resins may be preferred for many purposes, e.g., in conjunction with a heat-reflective metal layer for heat-resistive purposes.

What is claimed is:

1. A thin, flexible, self-sustaining, continuous composite sheet capable of being formed in rolls for storage and transportation and, upon being unwound from roll form, of being flexed and handled and of being cut with a knife to provide an edge which may be characterized as ragged but free from fissures extending more than ¼ inch into the glass, said composite sheet comprising (1) a flexible carrier web, (2) a detachable layer of glass having a thickness of about 0.001-0.010 inch and, interposed between said carrier web and said layer of glass, (3) a layer of rubbery, stably tacky adhesive which has preferential adherence to the carrier web and has an adhesion-to-steel value of 1–12 ounces per inch of width.

2. A composite self-sustaining sheet capable of being flexed and handled, as in storing, cutting into panels and laying up on forms, the said composite comprising (1) a flexible, fibrous web impregnated with a fusible resin composition, said resin composition being potentially heat-curable in contact with glass to a hard, tough, dense resinous state having good adhesion to glass and, adherently bonded thereto, (2) a glass sheet having a thickness of about 0.001–0.010 inch, (3) a flexible carried web and, interposed between said carrier web and said glass sheet, (4) a layer of rubbery, stably tacky adhesive which has preferential adherence to the carrier web and has an adhesion-to-steel value of 1–12 ounces per inch of width.

References Cited in the file of this patent

UNITED STATES PATENTS

| | | |
|---|---|---|
| 1,690,179 | Sadtler | Nov. 6, 1928 |
| 1,809,984 | Mails | June 16, 1931 |
| 2,020,255 | Copeman | Nov. 5, 1935 |
| 2,095,269 | Schuler | Oct. 12, 1937 |
| 2,366,514 | Gaylor | Jan. 2, 1945 |
| 2,383,469 | Colbert et al. | Aug. 28, 1945 |
| 2,392,768 | Ryan | Jan. 8, 1946 |
| 2,397,141 | Holtje | Mar. 26, 1946 |
| 2,407,549 | Gurwick | Sept. 10, 1946 |
| 2,561,449 | Ruderman | July 24, 1951 |
| 2,562,951 | Rose et al. | Aug. 7, 1951 |
| 2,603,899 | Leander | July 22, 1952 |
| 2,622,656 | Pinsky | Dec. 23, 1952 |
| 2,641,068 | Thompson | June 9, 1953 |
| 2,702,580 | Bateman | Feb. 22, 1955 |
| 2,714,569 | Prindle et al. | Aug. 2, 1955 |
| 2,725,324 | Holes | Nov. 29, 1955 |
| 2,758,342 | Squires | Aug. 14, 1956 |
| 2,835,623 | Vincent et al. | May 20, 1958 |
| 2,847,395 | Wear | Aug. 12, 1958 |
| 2,865,788 | Nischk et al. | Dec. 23, 1958 |

FOREIGN PATENTS

| | | |
|---|---|---|
| 836,776 | France | June 25, 1939 |

OTHER REFERENCES

"Fiberglass Reinforced Plastics," by Ralph H. Sonneborn, pub. 1954, pages 1 and 2 cited.

UNITED STATES PATENT OFFICE
CERTIFICATE OF CORRECTION

Patent No. 3,089,801                     May 14, 1963

Hubert J. Tierney et al.

It is hereby certified that error appears in the above numbered patent requiring correction and that the said Letters Patent should read as corrected below.

In the heading to the sheet of drawings, line 2, and in the heading to the printed specification, line 2, title of invention, for "ULTRA-THIN GLASS SHEET", each occurrence, read -- PROTECTED ULTRA-THIN GLASS SHEET --; column 1, line 10, for "thin" read -- ultra-thin --; line 64, for "An" read -- Any --; column 6, line 24, after "than" insert -- about --; line 40, for "carried" read -- carrier --; line 49, for "Mails" read -- Mains --.

Signed and sealed this 3rd day of December 1963.

(SEAL)
Attest:

ERNEST W. SWIDER

Attesting Officer

EDWIN L. REYNOLDS

Acting Commissioner of Patents